(No Model.)

J. V. NICOLAI.
CEMENT PIPE CONNECTION.

No. 309,975. Patented Dec. 30, 1884.

Attest:
John A. Berm
William H. Haller

Inventor.
John V. Nicolai
by James H. Layman
Atty.

UNITED STATES PATENT OFFICE.

JOHN V. NICOLAI, OF CINCINNATI, OHIO.

CEMENT-PIPE CONNECTION.

SPECIFICATION forming part of Letters Patent No. 309,975, dated December 30, 1884.

Application filed April 7, 1884. (No model.)

*To all whom it may concern:*

Be it known that I, JOHN V. NICOLAI, a citizen of the United States, residing at Cincinnati, in the county of Hamilton and State of Ohio, have invented certain new and useful Improvements in Cement-Pipe Connections, of which the following is a specification, reference being had therein to the accompanying drawings.

The object of my invention is to facilitate the coupling of branch or lateral pipes to mains composed of ordinary terra-cotta or cement or similar but non metallic materials, and without being compelled to take up or cut away any of the sections of said mains. To accomplish this result the terra-cotta or cement pipe has a suitable hole made therein before it is burned, and after the pipe is finished this hole has securely fitted in it a metallic thimble or bushing, which latter is a permanent attachment to said pipe, the connection being effected either with bolts or other appropriate retaining devices. Furthermore, this metallic bushing or thimble has an internal screw to admit a threaded plug, the removal of which plug enables a branch pipe to be readily engaged with said thimble; but, if preferred, a cap may be permanently secured to the thimble, and be drilled to admit the branch pipe, as hereinafter more fully described.

Figure 1:
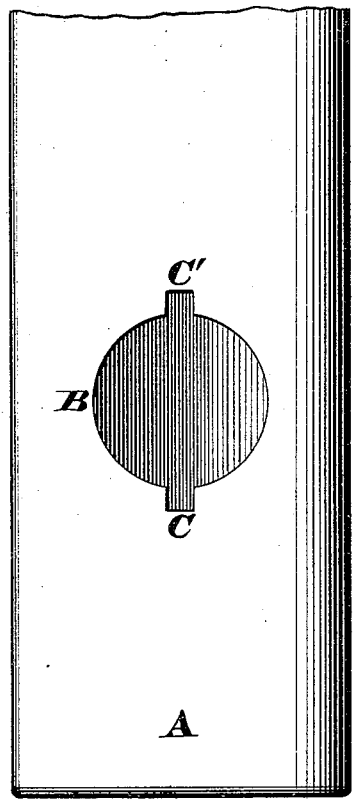
Figure 2:
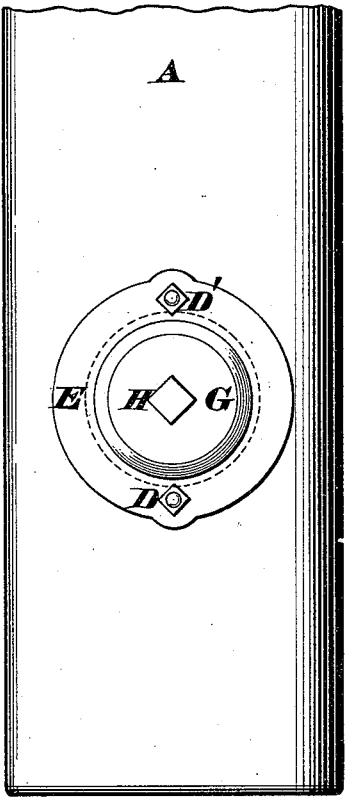
Figure 3:
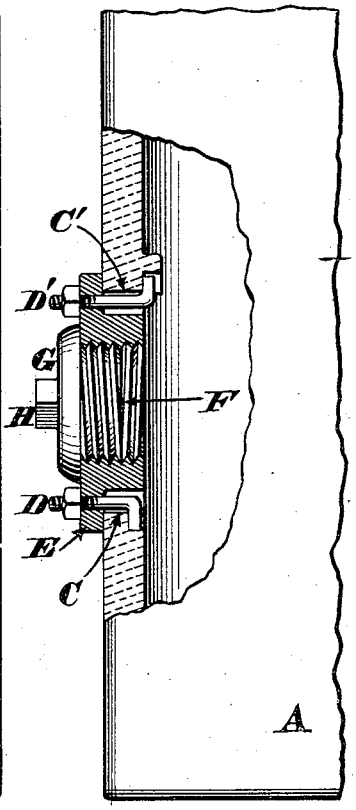
Figure 4:
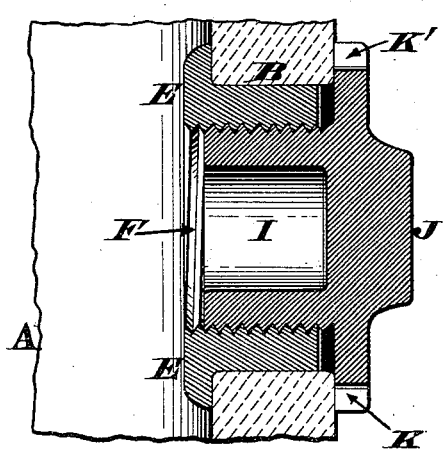
Figure 5:
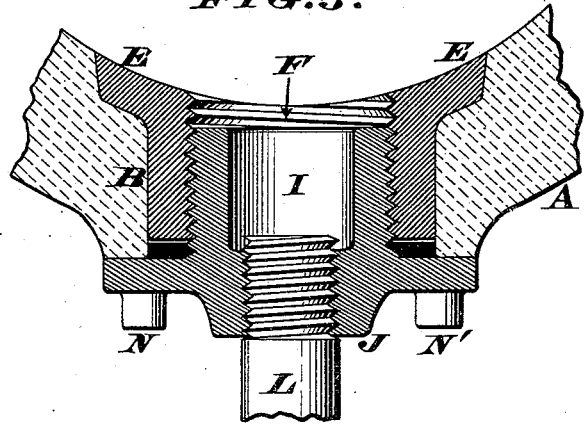

In the annexed drawings, Figure 1 is a side elevation of a portion of a terra-cotta or cement or other non-metallic pipe having the hole made therein. Fig. 2 is a similar elevation showing the thimble fitted to the pipe and the plug screwed into said thimble or bushing. Fig. 3 is a vertical section of the coupling. Figs. 4 and 5 are sections of a modification of my invention.

A represents a portion of a terra-cotta or cement or other non-metallic pipe, which is made of any of the materials capable of being employed for such a purpose, said pipe having a hole, B, cut therein before the pipe is burned, which hole may be of any suitable shape and diameter. I prefer, however, to make this opening circular, and to flank it on two opposite sides with grooves or seats C C', to admit hook-bolts D D', wherewith a metallic thimble, E, is secured in said opening. As shown in Fig. 3, the hook of the lower bolt, D, engages with a socket on the inner side of the pipe, while the hook of the upper bolt, D', bears upon a keeper, thereby indicating that the rotation of said bolts may be guarded against in any suitable manner. Thimble or bushing E is screw-threaded internally at F, to permit the ready engagement of a suitable plug, G, which plug may be provided with any device that will allow it to be turned with facility; but in the present illustration said plug is shown as furnished with a "square," H, to receive a spanner or wrench.

Previous to the insertion of the metallic bushing E cement is to be applied around the hole B, in order that a perfectly-tight joint may be formed when said bushing is clamped in place by the hook-bolts D D', and as soon as the cement has hardened the plug G H is screwed home.

After the main has been laid in the ground, and it is desired to couple a branch or lateral pipe thereto for any purpose whatever, the plug G H is unscrewed from the thimble or bushing E, and said branch is at once engaged with the internal thread, F.

In the modification of my invention, as shown in Figs. 4 and 5, the thimble or bushing E is applied to the interior of the main, and the exteriorly-threaded neck I of a cap, J, is screwed into said thimble, this cap being furnished with notches K K' to receive a suitable spanner, wherewith said bushing and cap are immovably clamped to the main A after cement is applied around the hole B. It is the intention to have this cap J remain in the thimble at all times, and when the lateral or branch L is to be coupled to the main said cap is either bored or screw-threaded, and the lateral engaged therewith, as seen in Fig. 5. Furthermore, this illustration shows the flange of the thimble E seated in an annular recess made in the interior of pipe A, while the exterior of said pipe has a raised face for the flange of the cap J to close against. Again, this illustration shows the cap as being provided with lugs or studs N N' to receive a spanner.

It is evident either of the above couplings allows an ordinary terra-cotta or cement pipe to be used either for conveying water or gas, and permits the house or lateral connections to be made with such a main without tearing up any of its sections or cutting them away to receive the branches, which cutting of a cement pipe after it has been baked is a slow and laborious operation, and frequently results in breaking the main and loosening its joints.

Another great advantage due to my invention is that it allows an ordinary terra-cotta or cement pipe to be employed for conducting either gas or water, thereby overcoming the expense and inconvenience incidental to laying down iron mains, as has heretofore been necessary.

I am aware it is not new to attach screw-threaded couplings or thimbles to sheet-metal pipes by means of rivets, and then coat said pipes both internally and externally with cement, as such an invention is the subject of the patents granted to M. Stephens, April 2, 1872, and October 29, 1872. Also, I am aware it is not new to form a hand-hole in an iron pipe by casting the metal around the base of a smooth or unthreaded bushing or ring, as this method of making such holes in cast-iron pipes is seen in the patent granted to P. W. Doherty, August 29, 1882. Therefore I expressly disavow any intention of claiming a bushing, thimble, or coupling either for a sheet or cast metal pipe, and limit my invention to a terra-cotta or cement or other non-metallic pipe having a hole made therein before it is burned, and into which hole the thimble, bushing, or coupling is subsequently secured.

I claim as my invention—

1. A cement or terra-cotta or other non-metallic pipe having a suitable hole communicating with its bore or passage, into which hole is permanently secured a metallic thimble, bushing, or coupling that receives a detachable cap or cover, for the purpose herein described.

2. The cement or terra-cotta or other non-metallic pipe A, having a suitable hole, B C C', therein, into which hole the screw-threaded metallic bushing E F is permanently secured by bolts D D', said bushing having the plug G engaged therewith, for the purpose herein described.

In testimony whereof I affix my signature in presence of two witnesses.

JOHN V. NICOLAI.

Witnesses:
JAMES H. LAYMAN,
SAML. S. CARPENTER.